United States Patent
Springer

(10) Patent No.: US 9,568,708 B2
(45) Date of Patent: Feb. 14, 2017

(54) SMARTPHONE LENS ASSEMBLY

(75) Inventor: Gilbert Springer, Fremont, CA (US)

(73) Assignee: AppBANC, LLC, Santa Clara, CA (US)

( * ) Notice: Subject to any disclaimer, the term of this patent is extended or adjusted under 35 U.S.C. 154(b) by 304 days.

(21) Appl. No.: 13/993,866

(22) PCT Filed: Dec. 13, 2011

(86) PCT No.: PCT/US2011/064645
§ 371 (c)(1),
(2), (4) Date: Oct. 15, 2013

(87) PCT Pub. No.: WO2012/082738
PCT Pub. Date: Jun. 21, 2012

(65) Prior Publication Data
US 2014/0078594 A1   Mar. 20, 2014

Related U.S. Application Data

(63) Continuation-in-part of application No. 13/638,866, filed on Oct. 16, 2012, now Pat. No. 9,001,176.
(Continued)

(51) Int. Cl.
*G02B 15/02* (2006.01)
*G02B 7/16* (2006.01)
(Continued)

(52) U.S. Cl.
CPC .............. *G02B 7/16* (2013.01); *G02B 13/009* (2013.01); *G02B 15/04* (2013.01); *H04M 1/0264* (2013.01)

(58) Field of Classification Search
CPC ....... G02B 13/009; G02B 13/02; G02B 13/04; G02B 13/08; G02B 13/12; G02B 15/00; G02B 15/02; G02B 15/04; G02B 15/06; G02B 15/10; G02B 17/14; H04N 5/2254; H04M 1/04; H04M 1/0264
(Continued)

(56) References Cited

U.S. PATENT DOCUMENTS 3,577,900 A   5/1971   Peterson et al.
4,348,089 A   9/1982   Shenk
(Continued)

FOREIGN PATENT DOCUMENTS

CN   1992742 A   7/2007
CN   101135769 A   3/2008
(Continued)

OTHER PUBLICATIONS

T-Skware. IPhone Magnifying Camera Mod. www.Instructables.com. Nov. 10, 2010, retrieved on Apr. 9, 2012, Retrieved from the Internet <http://web.archive.org/web/20101112075836/http://www.Instructables.com/id/iPhone-Magnifying-Camera-Mod/step7/Update/>. pp. 1-27.
(Continued)

*Primary Examiner* — James Phan
(74) *Attorney, Agent, or Firm* — Sawyer Law Group, P.C.

(57) ABSTRACT

A lens assembly for a smartphone and a method of use is disclosed. In a first aspect, a lens assembly comprises a rotatable wheel; wherein the wheel includes at least two lenses. The lens assembly includes a skin portion coupled to the rotatable wheel, wherein the skin portion is adjustable to cover a smartphone. The at least two lenses of the wheel are positioned such that when one of the lens of the assembly is properly positioned it covers the lens of a camera on the smartphone. In a second aspect the method comprises providing a lens assembly over a camera lens of a smartphone chassis. The lens assembly includes a plurality of lenses that are rotatable. The method includes ensuring that the center
(Continued)

of the smartphone lens is congruent with the center of the selected lens of the plurality of lens by referencing at least two surfaces of the smartphone chassis.

11 Claims, 12 Drawing Sheets

Related U.S. Application Data

(60) Provisional application No. 61/422,520, filed on Dec. 13, 2010.

(51) Int. Cl.
  *G02B 13/00*  (2006.01)
  *G02B 15/04*  (2006.01)
  *H04M 1/02*  (2006.01)

(58) Field of Classification Search
  USPC ....... 359/670–673, 819, 827, 821; 455/575.1
  See application file for complete search history.

(56) References Cited

U.S. PATENT DOCUMENTS

| | | |
|---|---|---|
| 6,804,460 B1 | 10/2004 | Oshima et al. |
| 7,015,954 B1 | 3/2006 | Foote et al. |
| 2003/0164895 A1 | 9/2003 | Viinikanoja et al. |
| 2004/0017491 A1 | 1/2004 | Stavely |
| 2005/0101348 A1 | 5/2005 | Wang |
| 2008/0239170 A1 | 10/2008 | Klosowiak et al. |
| 2009/0097124 A1 | 4/2009 | Lundgren |
| 2010/0066677 A1 | 3/2010 | Garrett et al. |
| 2010/0168370 A1 | 7/2010 | Hatano et al. |
| 2010/0238344 A1 | 9/2010 | Tsai |

FOREIGN PATENT DOCUMENTS

| | | |
|---|---|---|
| CN | 201097453 Y | 8/2008 |
| CN | 101295125 A | 10/2008 |
| CN | 201130264 Y | 10/2008 |
| JP | 2003-262908 A | 9/2003 |
| JP | 2004-53836 A | 2/2004 |
| JP | 2004-208176 A | 7/2004 |
| JP | 2005-4170 A | 1/2005 |
| JP | 2005-249824 A | 9/2005 |
| JP | 2006-58830 A | 3/2006 |
| JP | 2006-154124 A | 6/2006 |
| WO | WO 03/043363 | 5/2003 |

OTHER PUBLICATIONS

The International Search Report and the Written Opinion of the International Searching Authority issued for International Application No. PCT/US2011/064645.

International Search Report and the Written Opinion of the International Search Authority for International Application No. PCT/US2011/031128, issued Nov. 22, 2011.

Office Action mailed Oct. 10, 2013 for U.S. Appl. No. 13/638,285.

Final Office Action mailed Apr. 25, 2014 for U.S. Appl. No. 13/638,285.

LIGHT RAY DISTORTION

INTERCHANGEABLE
CAROUSEL & CASE

ASSEMBLED CAROUSEL & CASE

INSERTION OF CAROUSEL TO CASE

CAROUSEL LOCATION HOLE WITH
ANNULAR SLIDER SURFACE AND
CAROUSEL LOCATER AND LOCK SPRING

CAROUSEL HOLE WITH SEMI-ANNULAR SLIDER SURFACE
AND CASE EDGE MARGIN THAT COOPERATES TO FIX
THE CAROUSEL POSITION

700

803

SMARTPHONE LENS ASSEMBLY

FIELD OF THE INVENTION

The present invention relates generally to smartphones and more particularly to a method and system for providing a lens assembly on a smartphone.

BACKGROUND OF THE INVENTION

Smart phones are rapidly approaching a dominant posture in the cell phone marketplace worldwide. According to the Gardner Group for example, there will be 75 million iPhones and 425 million competing smartphones sold in 2012. One of the prime attributes of the smartphone is its built in camera that is somewhat compromised in contrast to its hand-held camera cousins owing to the limits volumetrically imposed by the cell phone's portable and wearable dimensions. Accordingly, what is desired is a method and system to overcome these issues. The present invention addresses such a need.

SUMMARY OF THE INVENTION

A lens assembly for a smartphone and a method of use is disclosed. In a first aspect, a lens assembly comprises a rotatable wheel; wherein the wheel includes at least two lenses. The lens assembly includes a skin portion coupled to the rotatable wheel, wherein the skin portion is adjustable to cover a smartphone. The at least two lenses of the wheel are positioned such that when one of the lens of the assembly is properly positioned it covers the lens of a camera on the smartphone.

In a second aspect the method comprises providing a lens assembly over a camera lens of a smartphone chassis. The lens assembly includes a plurality of lenses that are rotatable. The method includes ensuring that the center of the smartphone lens is congruent with the center of the selected lens of the plurality of lens by referencing at least two surfaces of the smartphone chassis.

BRIEF DESCRIPTION OF DRAWINGS

The accompanying drawings illustrate an embodiment of the present invention and, together with the description, serve to explain the principle of the invention. One skilled in the art will recognize that the particular embodiments illustrated in the drawings are merely exemplary, and are not intended to limit the scope of the present invention.

DETAILED DESCRIPTION OF PREFERRED EMBODIMENTS

Figure 1A:
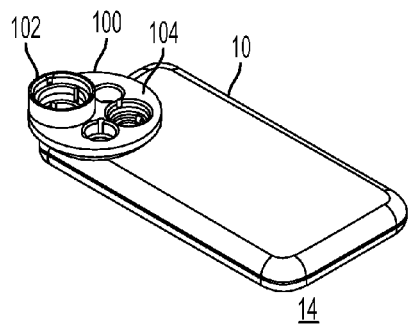
FIG. 1A-1E illustrates a lens/skin assembly.
Figure 1B:
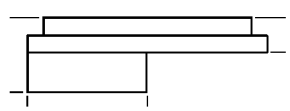
Figure 1C:
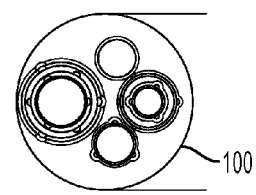
Figure 1D:
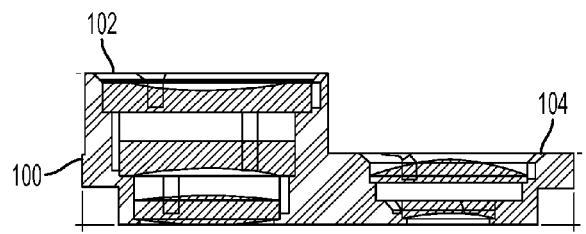
Figure 1E:
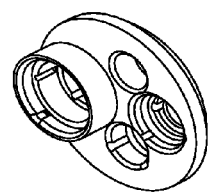

The present invention relates generally to smartphones and more particularly to a method and system for providing a lens assembly on a smartphone. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A lens assembly and method of use in accordance with the present invention has a plurality of features. They will be described in detail hereinafter in conjunction with the accompanying figures. The overall goal of this present invention is to provide lens versatilities in a smartphone and to provide a non-invasive solution involving a plurality of lenses resolving close-up (macro), wide-angle and telephoto range limitations of the smartphone. The avoidance of diminishing portability (wear-ability) of the smartphone is important. Therefore, bulky lenses, awkward mounting and spatially challenged lens selection mechanisms are not to be utilized.

To address these issues the present invention provides the following features.

1. Lens system comprised of single or multiple polymer or glass molded lens(es) with appropriate geometry to allow movable lens placement congruent with camera lens aperture on smartphone.

2. Hole in lens carousel with dual diameters, a geometric assembly to allow "native" or smartphone lens without the aid of external optics on lens configuration.

3. Lens configuration with annular form to allow rotary selection of lens.

4. Alternative rectangular lens configuration of a slider geometry to allow lens selection by linear translation of lens.

5. Identifier marking on lens wheel with ring encoding, stamping or insitu molding.

6. Lens system with full or bifurcated companion case for mounting on smartphone.

7. Lens case assembly with aperture(s) to accommodate interface connections, speaker, microphone, and smart phone control switches.

8. A stiction release method to enable a smooth release of the carousel.

9. A solution for each lens position to enable the smart phone flash function.

10. A means for preventing flash generated light scatter from interfering with the smart phone camera.

11. A means for interchangeable lens carousels. There is also a mention of lens coating to prevent glare.

13. A small aperture in the lens Carousel with its azimuth congruent to the "Native" smartphone lens azimuth, its purpose to isolate an object of interest from the camera's field of view with a surrounding dark field providing a cameo effect.

To describe these features in more detail refer now to the following discussion in conjunction with the accompanying Figures. Findings show the integration of lenses on a smartphone non-lens geometric features in a common mold introducing flow stress and annealing stresses, present complex material problems that are difficult to consider for production solutions. These observations have led to a determination that lenses geometries are best behaved when molded as discrete elements in a mold cavity. A further issue for this determination is economic considerations of providing multiple lenses in the smartphone. Therefore, a technique in accordance with an embodiment is applied in a single-lens or multiple of lenses in a lens set, per lens location geometry that integrates the telephoto/wide-angle two-component lenses into a single monolithic lens structure. A single mold cycle with single or multiples of lenses per lens set gives a substantial economic advantage. Further consideration of the lens integration have recognized a multi-cavity of lenses of different design having similar volumes of plastic per lens can enable a single mold, in the molders profession's term-of-art this configuration is known as a "family mold".

Figure 2:
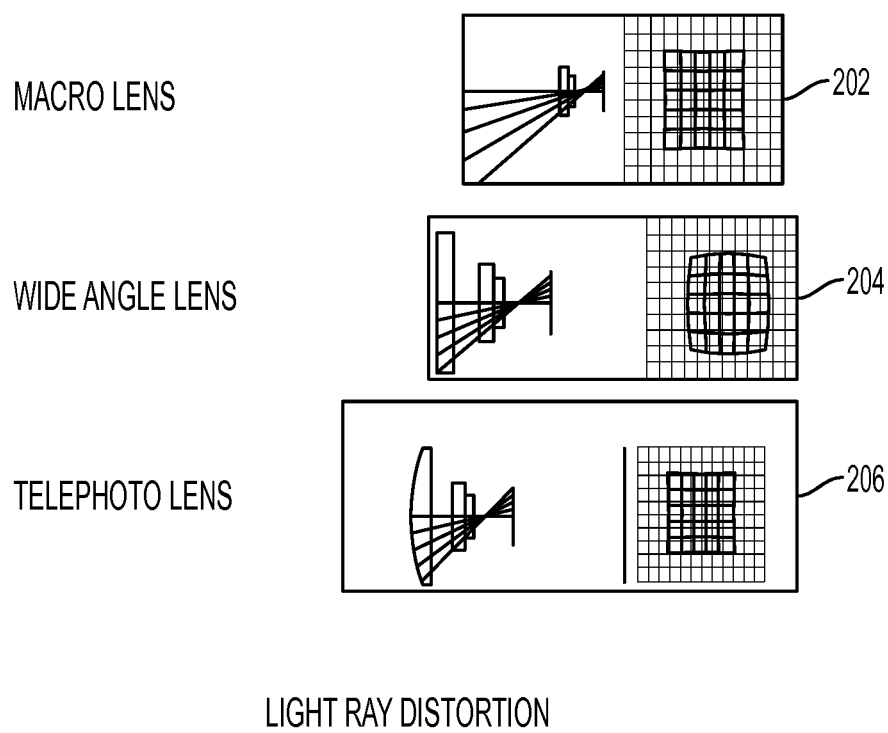
FIG. 2 illustrates a light ray distortion.

FIG. 1A-1E illustrates a lens assembly 100 placed on a skin 10 over a smartphone 14 in accordance with an embodiment. The assembly 100 is connected to a skin 10. The skin 10 is placed over the smartphone 14 such that the lens on the smartphone 14 is covered by the assembly 100. The assembly 100 includes a first and second lens 102 and 104, each of which can be rotatably moved over the lens on the smartphone 14. To ensure portability the lens thickness should typically be from 5-10 mm. As shown in FIG. 2, a telephoto lens 202 and a wide angle photo lens 204 can be utilized as the two lenses. Where the lenses 202 and 204 optical paths are insufficient to resolve the correct image due to the thickness constraints, such resolution images may take the form of corrected barrel distortion. Note the grid pattern showing to the right of the wide angle lens 204. The curvilinear shape grid (called "barrel distortion") represents a three-color light ray pilot of the lens performance at the smartphone's camera's detector grid array. Software can be utilized to re-assign values from a map of the barrel grid to a rectilinear grid to correct the distorted image. In a similar manner other lens compensations may be corrected by grid element assignments from a distortion map, i.e., that of the telephoto lens of FIG. 2.

Figure 3:
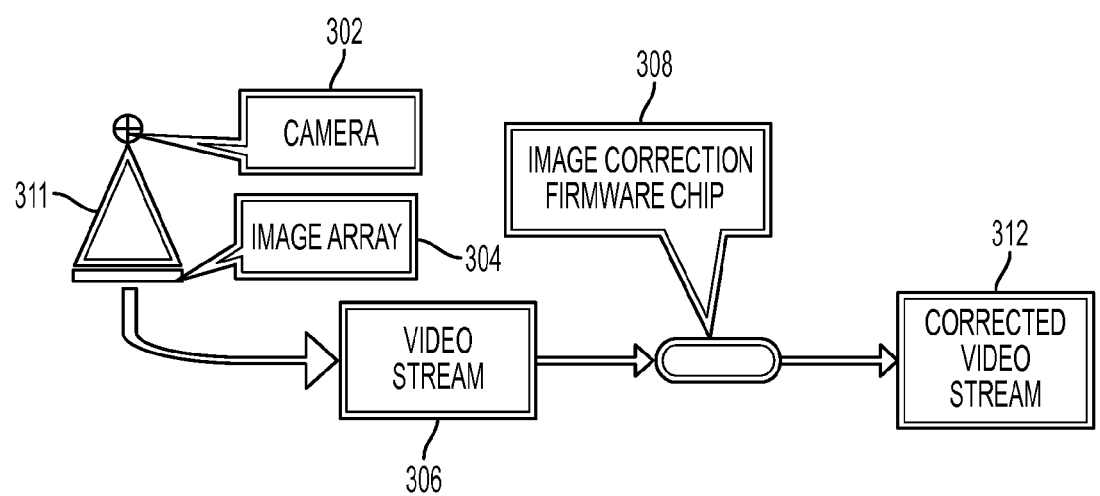
FIG. 3 illustrates an image correction mechanism for the lenses of the assembly.

Implementations described to correct lens resolutions through redistribution of chromic aberration and distortion can be provided. Grid element redistributions to a rectilinear grid format that may be accomplished through software or silicon based algorithms. The implementations can also be accomplished by locating a streaming media alterations corrections with the firmware intelligence to reorganize distortion grids to rectilinear grids in a live data stream in the smartphone, similar in function as the software approach. FIG. 3 illustrates an in data stream image correction mechanism for the lenses of the assembly 100. As is seen in FIG. 3, a camera 302 or image array can be provided as a video stream. Then a firmware chip 308 provides for image stream correction 312 which allows the video to be corrected. Then, the distortion grid map is dynamically assigned to a rectilinear grid format.

In another embodiment the lens correction software algorithms can be downloaded in the smartphone via developer applications by the phone provider or downloaded into the smartphone system to specifically apply corrections for each particular lens selected.

In a further embodiment, smartphone camera software application can be provided with selectable "smart tabs" (icons) to coordinate camera photo with selected lens. A smartphone software application will duplicate the smartphone's camera function complete with icon and camera's touch screen or physical switch photo-snap embellished with the added features of icon bars that associate a particular lens selection with the appropriate distortion grid array correction as shown in FIG. 2. The application will allow lens selection and photo operation with the appropriate lens selected and corrected.

Method of Lens Selection

Figure 4A:
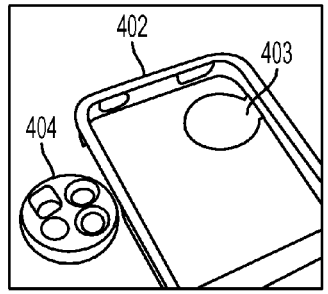
FIG. 4A-4E illustrate a portion of the assembly engaging the skin via the carousel wheel.
Figure 4B:
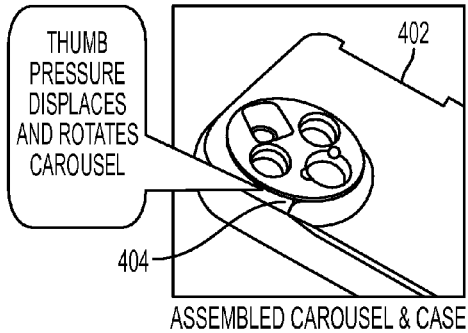
Figure 4C:
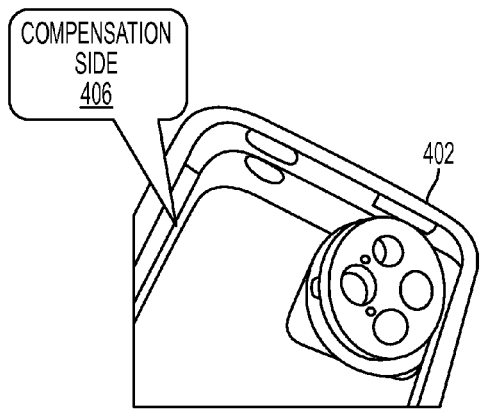
Figure 4D:
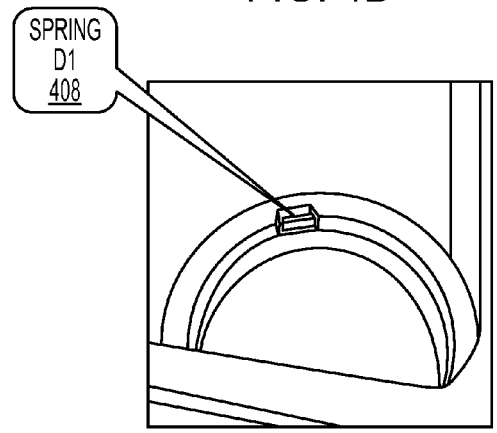
Figure 4E:
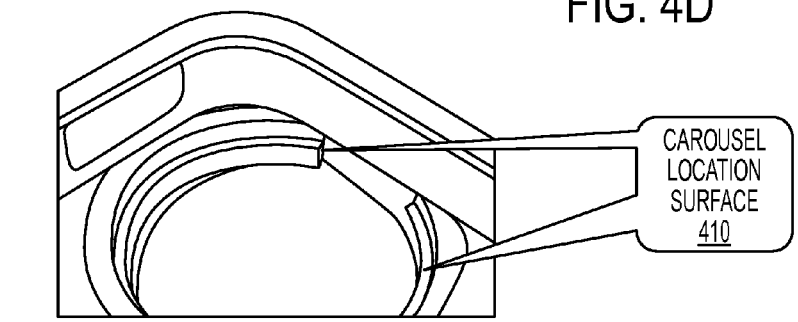

FIGS. 4A-4E illustrate a portion of the assembly engaging the skin via carousel wheel 404. As is seen the carousel wheel 404 is interchangeable with other carousels. In addition, as is seen in FIG. 4B the lenses are recessed into the carousel wheel to protect the lens for abrasion and contact impingement. In this embodiment carousel wheel can be interchanged to offer the user flexibility of multiple lens functions. For example a carousel wheel 404 could include a fisheye lens, telescoping lens, coated lens, lens of different colors or filters. A critical feature is the selection of the appropriate lens. In an embodiment, a new lens position is selected by applying a force on the carousel wheel 502 typically via the thumb of a user. Referring to FIG. 4A the aperture 403 has a differential diameter D1/D2 where the radius of D1 is less than the radius of D2. This allows a release of the wheel 404 for rotation by moving it from D1 to D2, slots 504 on the carousel wheel 404 registers a lens stop 610 position, and may be accompanied with an audible (clicking) ratchet action, informing the user when a lens is in the desired position. Accordingly, as is seen the carousel wheel hole with a semi-annular slider surface and case edge margin cooperate to fix the carousel wheel position. A spring 408 seeking the lens stop slot 610 latches the wheel 404 at each lens position whose geometric location directly aligns the azimuth center of the smart phone's camera lens to the azimuth center of the carousel wheel 404 lens, within the appropriate camera lens to carousel azimuth positioning tolerances.

Method of Lens Location

Figure 5:
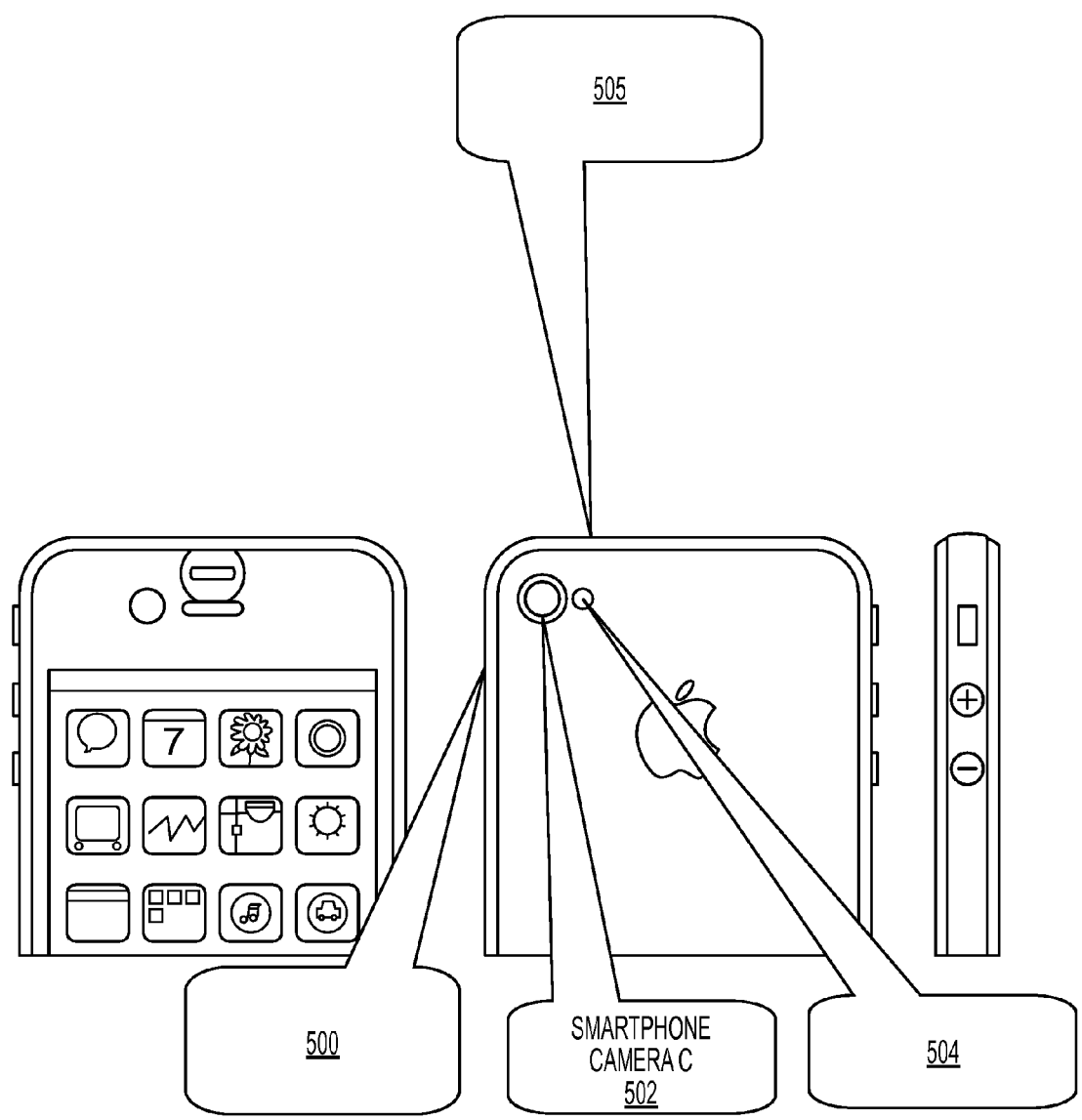
FIG. 5 shows a smartphone with location information relative to various features including the forward facing camera and a companion flash unit.

FIG. 5 shows a smartphone 500 with location information relative to various features including the forward facing camera 502 and a companion flash unit 504. The tooled case design utilizes the lens/flash feature coordinates as referenced to the smartphone chassis surfaces closest to the camera to insure maximum location accuracy to the auxiliary lens azimuth. For purposes of fabricating the case enclosure to the highest accuracy, attention to the mold design will focus on the "plastic compensation" design rules to optimize feature dimensions.

Note that uncertainty exists relative to the final size of the molded case enclosure thus demanding an over-sizing of critical case design features for "fine tuning" determined by observing first-article critical feature dimensions then determine final mold critical dimensions. This compensation consideration demands that the deliberate skewed for tuning dimensions, exacerbate the over-sizing compensations, to the case enclosure sides contacting the smart phone chassis opposite those chassis edges used as critical dimension reference edges 500 and 505 of FIG. 5, see compensation edges located at the case bottom.

Figure 6:
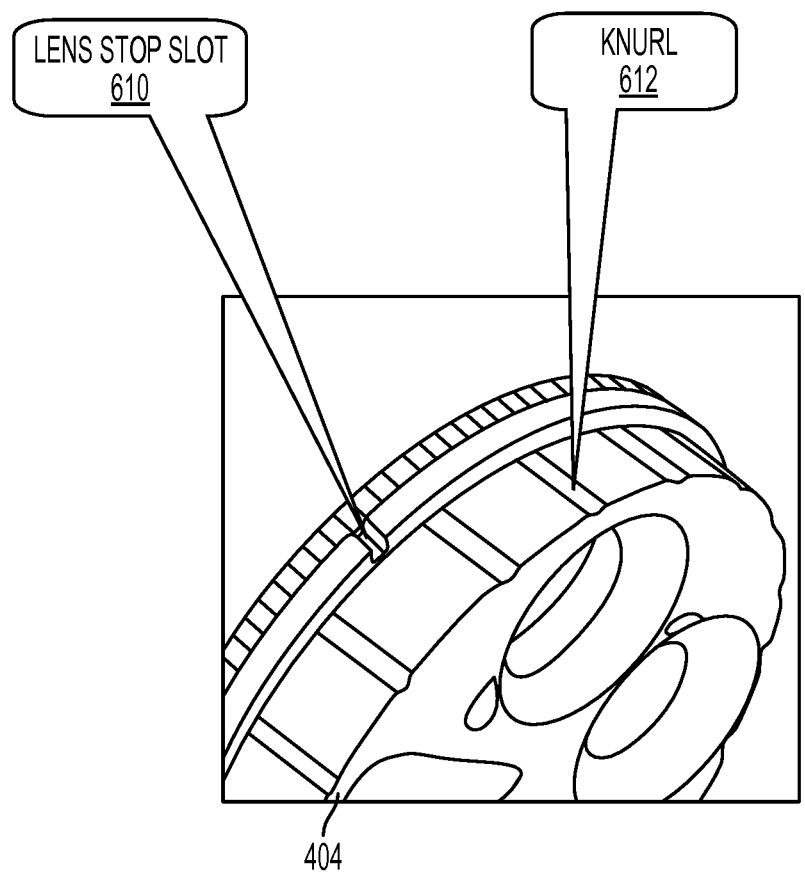
FIG. 6 illustrates a new lens position, which is selected by the users thumb applying a force on the carousel wheel.

Referring back to FIGS. 4A-4E, the alignment is achieved through cooperation between a set-positioning receptor slot 410 on the carousel and the mounted-in-case companion deflection spring 408. FIG. 6 illustrates a knurl and the lens stop slot on the carousel wheel 404. When the user chooses to rotate the carousel's lens setting by gripping the knurl on the carousel when moving to a different lens, the previously described slight thumb force is applied on the carousel wheel 604, creating a counter diametric force to the ratchet spring displacing the carousel wheel 404 from D1 to D2 freeing the carousel wheel for rotation. The formed spring appendage, for example a plastic or a metallic springs, is generally located on the inside of the annular formation with an annular shaped nib that engages lens stop 610. Displacement of the carousel wheel against the spring displaces the carousel to D2, thereby breaking stiction and friction between the carousel wheel 404 and its annular well containment near the thumb wheel slot, allowing a free relocation of the lens positions, as shown in FIGS. 4A-4E.

The users thumb will apply a force towards the wheel releasing the wheel for rotation, Slots on the wheel allow a (click) ratchet action telling the user when the wheel is in position and latching the wheel at each lens position directly over the smart phones camera lens to the camera lens. The alignment is cooperation between the positioning slot on the carousel and the deflection spring that enables the carousel stiction release.

Figure 7:
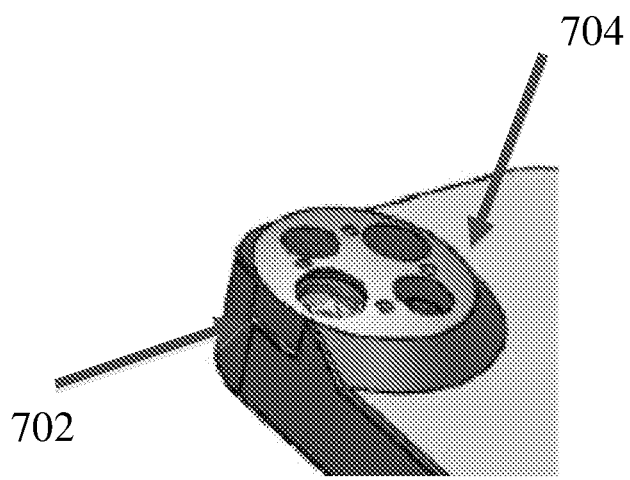
FIG. 7 involves a minute displacement of the lens carousel in order to reduce contact with the annular receptor surface formed on the case.
Figure 8:
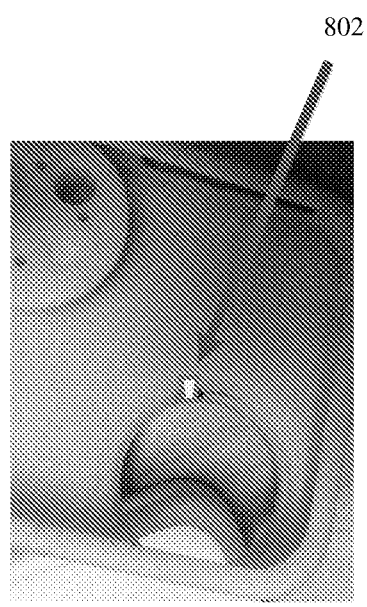
FIG. 8 illustrates a depiction of the spring at the tip of arrow C.

FIG. 7 involves a minute displacement of the lens carousel in order to reduce contact with the annular receptor surface formed on the case. When one chooses to displace the lens setting to a different lens, a slight thumb force is applied on the case at the tip of the arrow 702, creates a counter diametric force causing displacement of the carousel towards a plastic appendage affixed somewhat diametrically opposed to the accessible slot in the carousel well, that performs the function of a spring-deflection. The formed plastic spring appendage is generally located on the inside of the annular formation on the case at the arrow tip 704 breaking stiction between the carousel and its annular well containment near the thumb wheel slot, allowing free displacement of the lens positions. See depiction of the spring at the tip of arrow 802 in FIG. 8.

Method of Enabling Flash

Figure 9:
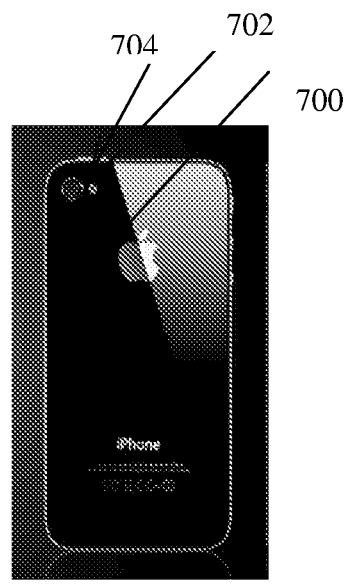
FIG. 9 illustrates the backside of the iPhone 4 and the camera/Flash deployment.

Apple introduced its iPhone 4 in June of 2010, with a camera/flash nuance posing a challenge for the accessory carousel lens. The design solution to the lens/flash combination required a means for allowing each lens selection to allow the camera flash solution. FIG. 9 shows the backside of the iPhone 4 700 and the camera/flash deployment. The camera and flash unit 702 are located in the upper-left hand corner. The close proximity of the flash unit 702 to the camera requires careful innovation to enable each setting of the lens to enable the flash function without providing a leakage path between the flash unit 702 and the lens 704.

Figure 10:
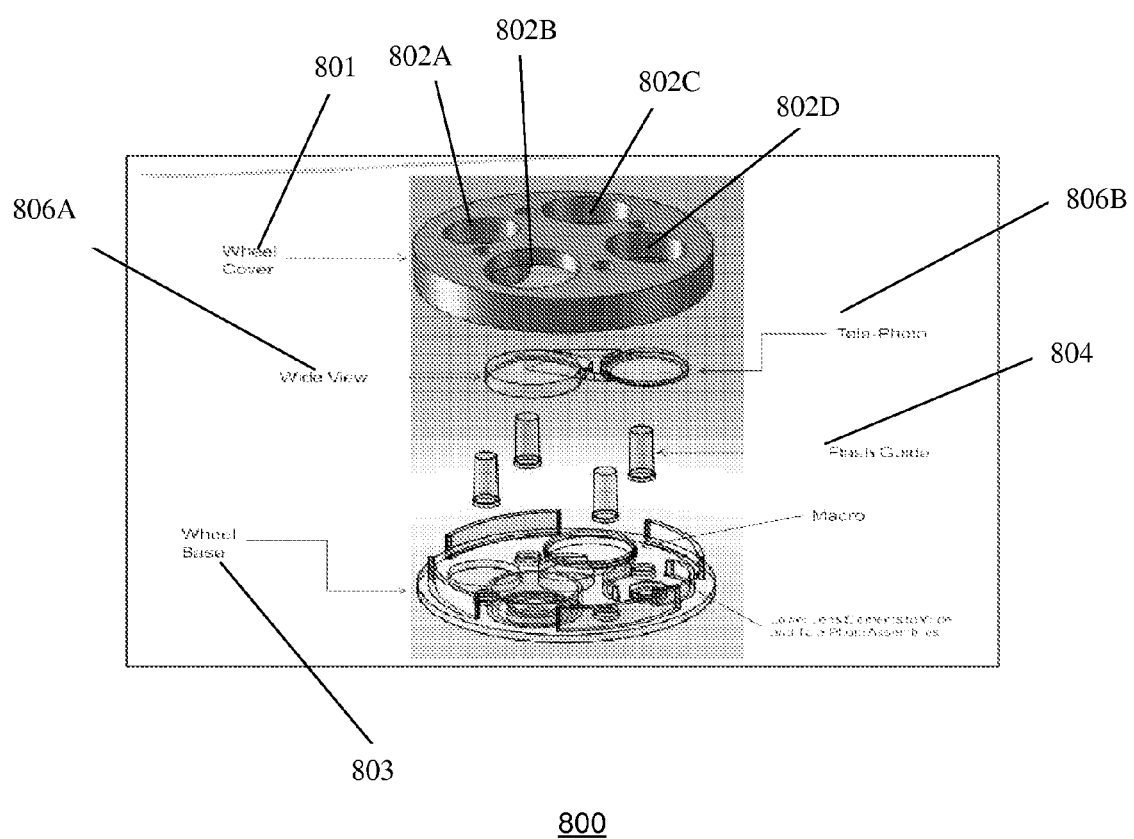
FIG. 10 illustrates the lens carousel (wheel cover) with slots for lenses and the "Flash Guide" light-pipes.

FIG. 10 illustrates a lens carousel 800 which includes wheel cover 801 and a base 803. The wheel base 803 includes slots 802A-802D for holding light pipes 804. The wheel cover 801 includes a wide view lens 806A, a telephoto lens 806B. The material is either polycarbonate or COC plastic or other suitable optic grade plastics. In this case, however, certain materials such as acrylic and other plastics could be suitable. Alignment slots are formed in both the wheel cover 801 and the wheelbase 803 to accept the light pipes 804. The flash guide solution represents an efficient conduit for the light providing low loss transmission of the camera's flash to the top surface of the lens carousel 800. The wheel cover 801 and wheelbase 803 are black bodies eliminating light scatter into the camera lens.

Method of Preventing Flash Light Scatter Impingement to Camera.

Figure 11:
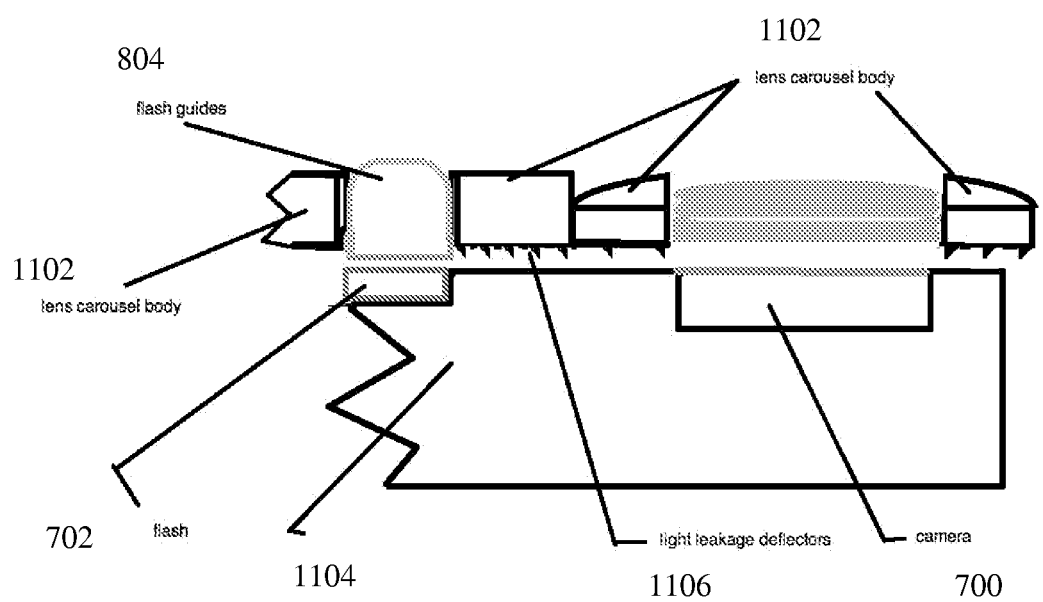
FIG. 11 illustrates the bottom surface of the carousel's wheelbase in contact with the smartphone.

FIG. 11 shows the bottom surface of the carousel's wheelbase 803 in contact with the smartphone. The bottom side of the carousel's wheelbase 803 features a disruptive surface design texture 1106 in the form similar to a metal file's surface, i.e., saw tooth like ridges, designed to inhibit light scatter from the smart phone's flash aperture/flash-guide interface from leaking into the camera 700. The pattern features have angular surfaces facing light sources that inhibit light reflections 1104 (typically zig-zag trajectories) off the smart phone's body from reaching the camera lens.

Method of Interchangeable Carousel

Figure 12:
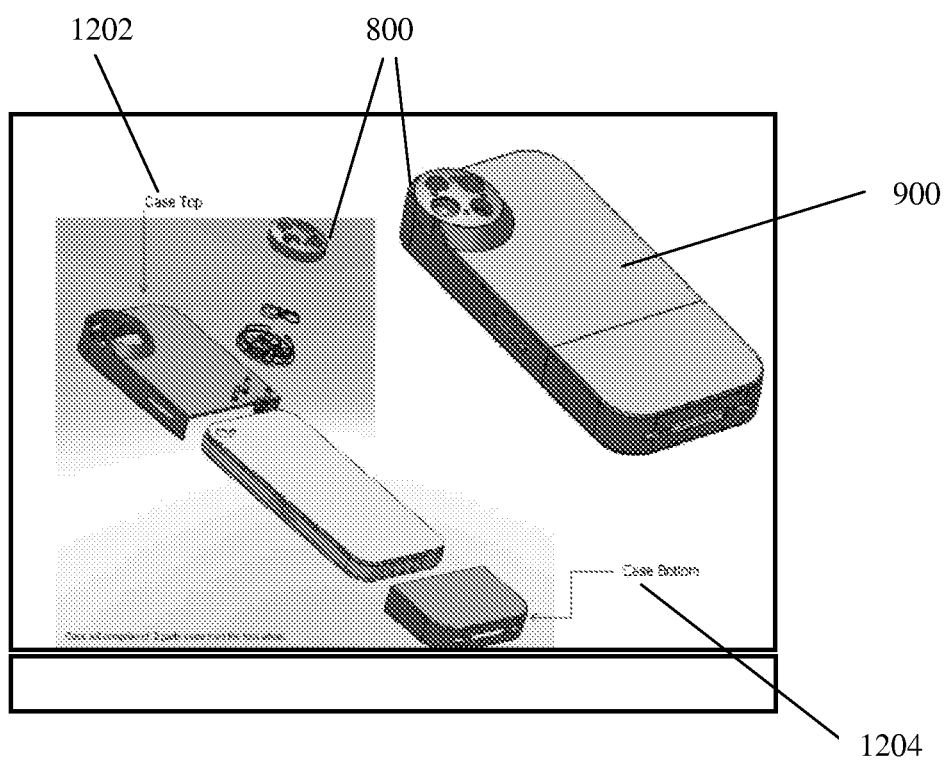
FIG. 12 illustrates the lens carousel assembly and case.

FIG. 12 shows a lens carousel assembly 800 and case 900. The carousel assembly 800 is designed to be replaceable and/or interchangeable with replacement lenses or alternative lenses with other feature applications such as gain variations, distortions, filters, coated lenses and/or special effects. The case top 1202, and the case bottom 1204 form the top and bottom portions of the lens carousel. The carousel 803 "snaps" in and out of the case 900 aperture.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A lens assembly comprising:
   a rotatable wheel; wherein the wheel includes a lens or lens set carousel with at least two lenses, the lens carousel including a wheel cover and a wheel base with flash guides therebetween; and
   a skin portion coupled to the rotatable wheel, wherein the skin portion is adjustable to cover a smartphone; the lenses of the wheel are positioned such that when one of the lenses of the assembly is properly positioned it covers a lens of a camera on the smartphone.

2. The lens assembly of claim 1, wherein the at least two lenses includes a wide angle lens and a telephoto lens.

3. The lens assembly of claim 1, wherein the images provided by the at least two lenses can be compensated by an error correction mechanism.

4. The lens assembly of claim 3 wherein the error correction mechanism comprises an application that has multiple lens selections that will correct each lens for is particular distortion pattern.

5. The lens assembly of claim 4 wherein the error correction mechanism comprises an integrated circuit within the smartphone video stream.

6. The lens assembly of claim 1, wherein the wheel includes a plurality of slots that are utilized to indicate that one of the two lenses is in a desired position.

7. The lens assembly of claim 6, wherein a spring latches the wheel at each lens position.

8. The lens assembly of claim 7 wherein a cooperation of a force applied by the spring to a location slot on the wheel displacing the lens to a first diameter and thereby ensuring the position of the selected lens to be congruent with the camera lens.

9. The lens assembly of claim 1, wherein the thickness of the at least two lenses or lens sets comprise any of a macro lens, telephoto lens, wide angle lens, a fisheye lens, coated lens, and lenses of different colors or filters.

10. The lens assembly of claim 1, wherein the thickness of the at least two lenses is from 5-10 milllimeters.

11. The lens assembly of claim 1, wherein the at least two lenses are recessed within the carousel wheel.

* * * * *